INVENTORS
KWANGHO CHUNG
GEORGE A. GOEPFRICH
EDWARD J. MILANO

BY *Lindsey, Prutzman and Hayes*
ATTORNEYS

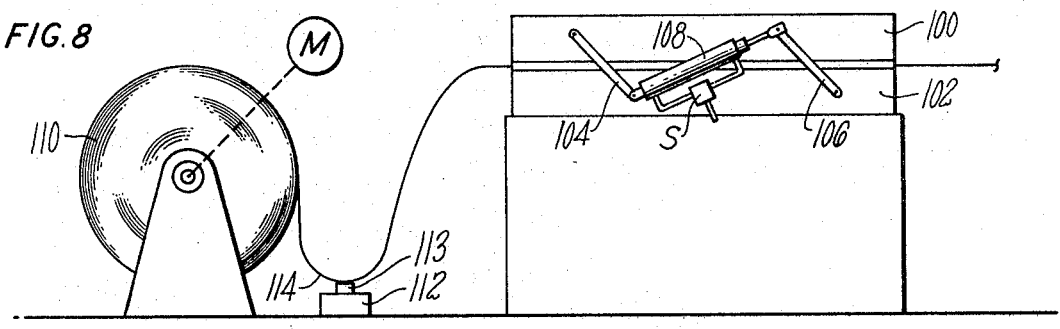
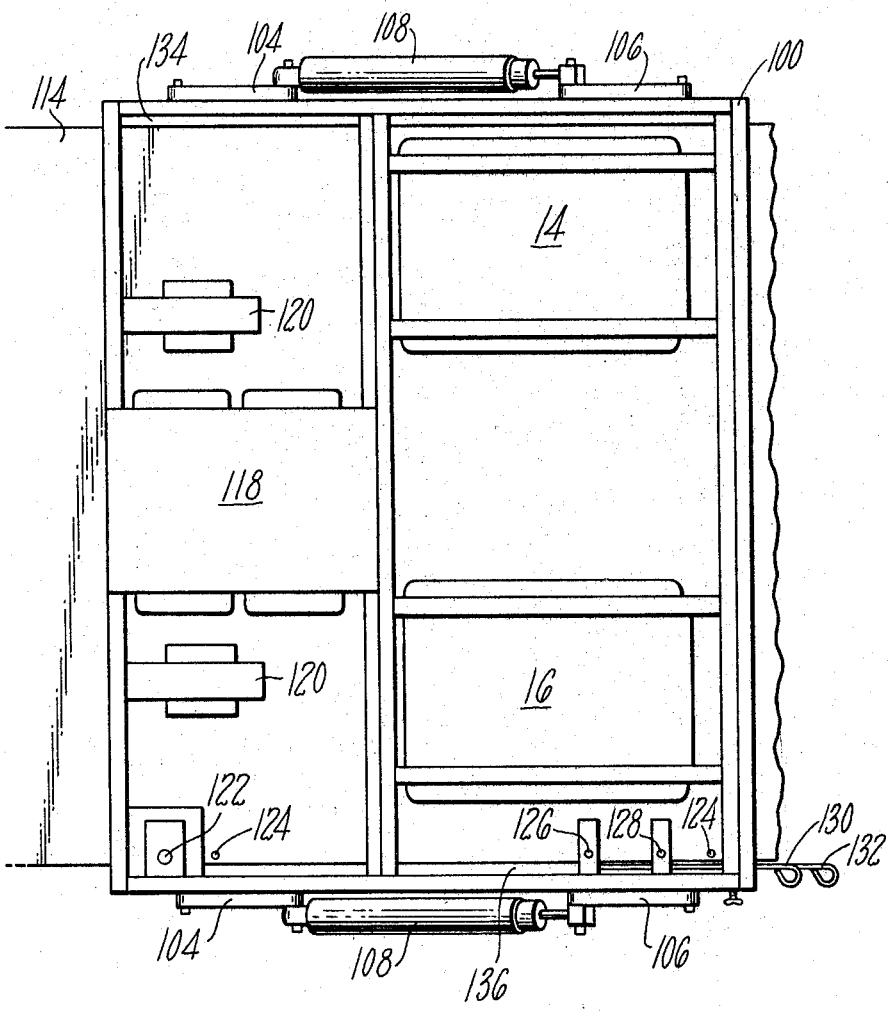

United States Patent Office 3,523,631
Patented Aug. 11, 1970

---

3,523,631
FOIL FEEDING SYSTEM
Kwangho Chung, Dallas, Tex., and George A. Goepfrich, New Britain, and Edward J. Milano, Bristol, Conn., assignors to Skinner Precision Industries, Inc., New Britain, Conn., a corporation of Connecticut
Continuation-in-part of application Ser. No. 623,098, Mar. 14, 1967. This application May 16, 1969, Ser. No. 830,571
Int. Cl. B65h 17/18
U.S. Cl. 226—39
17 Claims

ABSTRACT OF THE DISCLOSURE

A metallic foil feeding system in which the foil is propelled by linear induction motor action. A portion of the foil is placed within the active air gap of a linear induction motor. The foil acts as the armature of the motor and is caused to move in a direction defined by the traveling magnetomotive waves within the air gap. A motor controller profiles the application of a three phase alternating current to the stator. An inductive speed sensor may be provided to supply a signal proportional to the foil speed to the motor controller in order to regulate the foil speed. The foil may be braked to a halt by reversing the three phase connections to the stators or by other foil braking means, such as a mechanical friction brake employing electrostatic, suction or high pressure fluid devices for forcing the foil into engagement with a stationary friction surface, or by an eddy current brake whose energization is coordinated with the linear induction motor. The motor controller may include photoelectric sensors responsive to punched holes in the foil to provide a signal to the motor controller for the pulsed feeding of fixed lengths of foil and a coordinated drive for the supply of foil strip included.

---

This invention relates generally to an improved metallic strip actuator and more particularly to a foil feeding system in which electrically conductive foil forms the movable armature of a linear induction motor whereby the foil is driven or fed relative to the stationary stator of the motor by electromagnetic forces and is a continuation-in-part of copending application Ser. No. 623,098 filed Mar. 14, 1967, now abandoned.

BACKGROUND OF THE INVENTION

Manufacturing and processing of thin metallic foils have greatly increased as the use of such materials in industrial, as well as consumer, markets have increased in recent years. Thin aluminum foils, especially, have gained much popularity among the diverse application areas.

In areas where these thin foils are to be processed or fabricated by such means as forming, cutting or stamping, some form of foil feeding system is needed. Conventional systems currently employed by the industry include one or more variations of mechanical feed rollers. In such arrangements the foil is threaded through a pair of the feed rollers which impart a pull force to the foil as the rollers are caused to rotate. When the desired length of the foil is fed, sufficient braking torque is applied to the feed rollers to stop the foil motion. For relatively low feed speeds and slow feed rates, such a conventional system is reasonably satisfactory. If, however, higher feed speeds and consequently higher speed rates are required, these prior are systems perform less satisfactorily because of the limitations inherent in a purely mechanical system. High inertia loading on the feed rolls, localized concentration of tensile stress on the foil proper and the tendency of foil to skew are some of the more serious problems.

These problems are solved by the improved foil feeding system by arranging the conductive foil as the movable armature of a linear induction motor.

BRIEF SUMMARY OF THE INVENTION

The invention may be briefly and broadly summarized as a metallic strip actuator employing an open-sided linear induction motor as the propelling means wherein the metallic strip forms the movable armature of the motor and the motor stator is fixed. An inductive speed sensor may be used to sense the speed of the foil and produce a corresponding electrical signal which controls the power applied to the motor stator in order to regulate the traveling speed of the strip. The strip may be braked to a halt by reversal of the phase of the power applied to the motor, by an eddy current brake, or by electrostatic or pneumatic force-generation devices for pressing the strip into engagement with a sationary friction surface whose actuation is coordinated with the propelling of the strip. The strip may be pulse fed in precise increments by a recycling control which profiles the power to the motor and an eddy current brake in response to an automatic timer and a strip position sensor.

Other features and advantages of the invention will be apparent from the following more particular description of preferred embodiments of the invention as illustrated in the accompanying drawings.

BRIEF DESCRIPTION OF THE DRAWINGS

FIG. 8 is a schematic diagram of another embodiment of the improved foil feeding system;

FIG. 9 is an enlarged top view of the embodiment of FIG. 8;

DETAILED DESCRIPTION OF PREFERRED EMBODIMENTS

Figure 1:
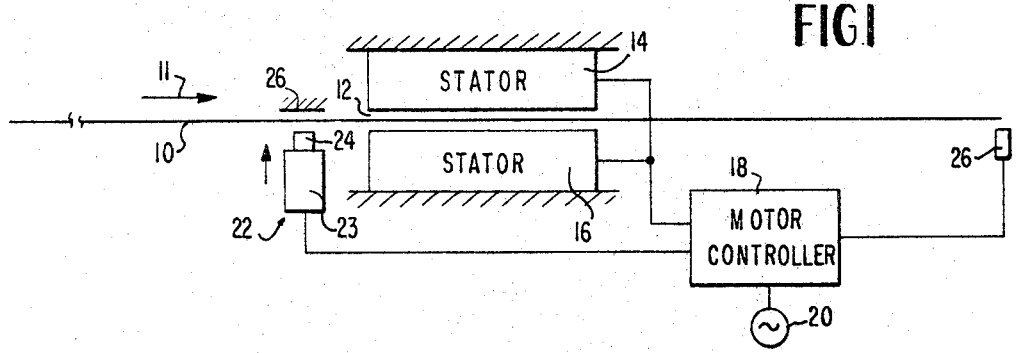
FIG. 1 is a schematic diagram of the improved foil feeding system in which the foil is halted by reversal of the applied power and including a solenoid detent.

A preferred embodiment of the invention is schematically illustrated in FIG. 1. A web 10 of aluminum foil is placed in the air gap 12 formed between two flat linear induction stators 14 and 16. The windings of stators 14 and 16 are supplied with three phase power from a motor controller 18 which is connected to a suitable three phase source 20.

It is assumed that the stators 14 and 16 are energized in a phase sequence such that the foil is accelerated in the direction indicated by arrow 11. The foil is propelled by induction motor action because the conductive foil 10 acts as the movable armature for the fixed linear induction stators 14 and 16.

The foil may be braked to a halt by operation of motor controller 18 to reverse the sequence of the three phase power applied to stators 14 and 16 thereby decelerating the foil. Motor controller 18 may be operated manually to brake the foil, or else an inductive speed sensor of the type described in the copending application Ser. No. 454,773 may be used to sense the speed of the foil and develop a proportional electrical signal which is applied to a power regulating means, such as an SCR phase controller, in the motor controller 18 to regulate the power applied to the stators and thereby maintain a uniform foil feeding speed.

A solenoid detent 22 is provided upstream of the stators 14 and 16. Once the foil is halted, the solenoid 23 is energized to cause the plunger 24 to engage the stop 26 and apply a light clamping pressure to the foil in order to prevent the foil from being moved while the solenoid is energized. Detent 22 may be a miniature, high speed, light moving mass solenoid. The solenoid may be energized by manual manipulation of the motor controller 18, or else the zero speed signal from the inductive sensor 26 may be utilized to activate suitable control circuitry in controller 18 to apply a DC voltage to the solenoid and to de-energize the stators.

Since linear induction motor action is used to generate the accelerating force for propelling the foil in the feeding system illustrated in FIG. 1, the type and physical size of the foils influence the magnitudes of the accelerating forces. However, with the proper design of the linear induction stators 14 and 16 and with efficient means of the heat dissipation, foil is made from such low conductivity metals as steel or brass can be fed by this improved system.

Figure 2:
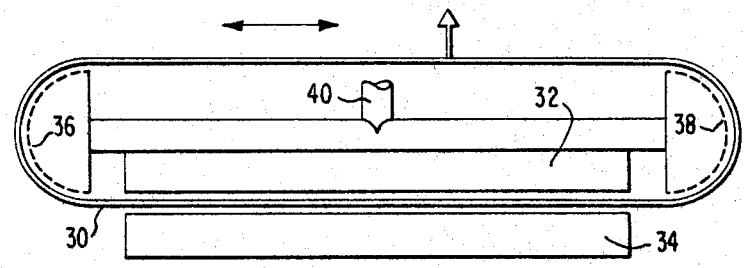
FIG. 2 is a schematic diagram of a pen drive for a chart recorder employing the principles of this invention.

Furthermore, non-conducting foils such as paper, Mylar, etc., can be fed by means of the improved system if such materials have metallic coatings on their surfaces or else are laminated with metal foil. FIG. 2 illustrates a pen drive system for a strip chart recorder in which a metal coated Mylar loop 30 forms the movable armature for linear induction stators 32 and 34. The loop is maintained by means of air bearings formed at the outlets 36 and 38 of a conduit having an inlet 40 to which air under pressure is applied.

FIGS. 3 through 7 illustrate other embodiments of the improved foil feeding system, all of which utilize linear induction motor action to provide the foil propelling force, and each of which has a different means for braking the foil to a halt. Corresponding components in all the figures are labeled with the same reference numerals.

Figure 3:
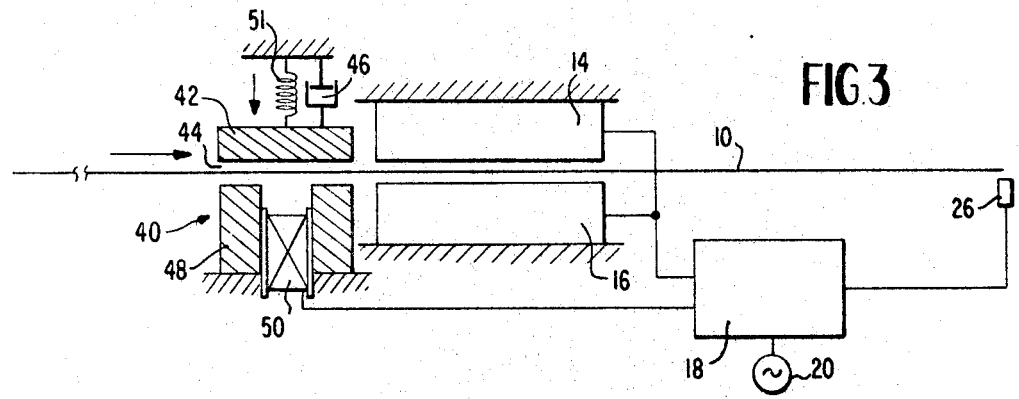
FIG. 3 is a schematic diagram of another embodiment of the improved foil feeding system including an eddy current brake for halting the foil.

FIG. 3 illustrates the improved foil feeding system including an eddy current brake 40 which provides the braking action to halt the moving foil 10. The movable brake armature 42 also provides detenting. To brake the foil to a halt in this case, controller 18 is either manually operated or activated in response to the inductive speed sensor 26 to open the power circuit to the stators 14 and 16 and apply direct current to the eddy current brake. A DC field is created within the air gap 44 formed between the eddy current brake core 48 and the brake armature 42. Initial braking force in the foil is provided by the interaction of the DC field and the eddy currents induced on the foil surface. The movable brake armature 42 is prevented from coming into physical contact with the foil due to its own inertia and the dashpot 46. The degree of damping offered by the dashpot is so selected that armature 42 is allowed to engage the foil only after the foil speed is sufficiently reduced by the eddy current braking action to prevent tearing of the foil. If the detenting action is not required, armature 42 can be made stationary so that it merely acts as a keeper to provide a magnetic flux return path for the eddy current brake 40. Where an extremely high braking force within a relatively short time duration is necessary, an air core may be substituted for the iron core 48 of the brake 40, and a high power pulse generator may be employed to supply the power necessary to energize the coil 50 of the brake. Spring 51 serves to return armature 42 to its upper position when the eddy current brake is de-energized.

The braking means illustrated in FIGS. 4–7 differ from the previous braking means in that the braking or decelerating forces are generated by mechanical friction between the moving foil and a stationary friction surface.

Figure 4:
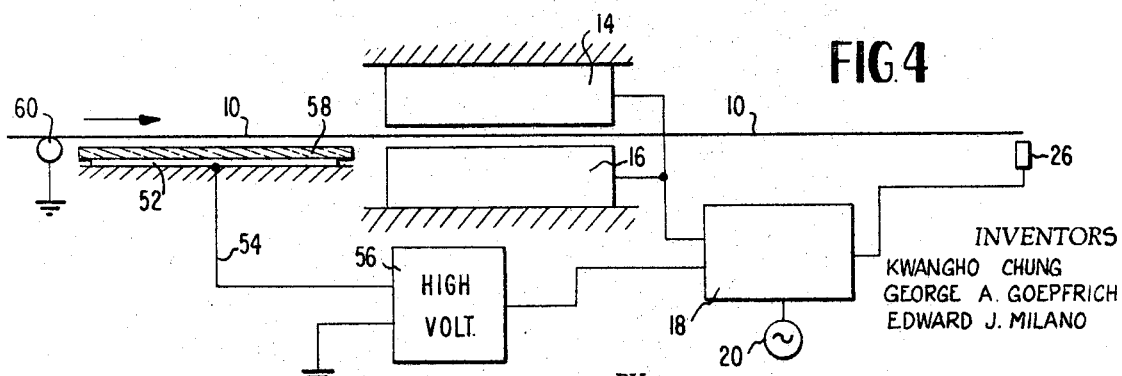
FIG. 4 is a schematic diagram of another embodiment of the improved foil feeding system including a mechanical friction brake with an electrostatic actuator.

In FIG. 4, the friction brake is in the form of a capacitor in which the foil 10 forms a movable plate of the capacitor. The other plate 52 of the capacitor is formed by a stationary piece of insulated sheet metal which is connected via a conductor 54 to a high voltage source 56 which is switched on by operation of the motor controller 18 in response to manual manipulation or response to a signal from the sensor 26. A sheet 58 of suitable dielectric material, such as glass, is inserted between foil 10 and plate 52 in order to increase the capacitance between the two plates. The top surface of dielectric sheet 58 also acts as the friction surface. A metal roller 60 engages the lowest surface of foil 10 and connects the foil to ground. When the high voltage source 56 is energized, the oppositely charged plates 10 and 52 produce an electrostatic force which attracts the foil plate 10 into contact with the top surface of the dielectric sheet 58 thereby braking the foil to a halt by means of the friction between the lower surface of the foil and the top surface of the dielectric sheet. Of course, the motor controller 18 disconnects the stators 14 and 16 from the power source 20 before the electrostatic brake is energized. To remove braking force from foil 10, the static charges accumulated in the capacitor must be eliminated. One means of accomplishing this result is to disconnect the stationary plate 52 from the high voltage source 56 and then ground the plate 52 to discharge the capacitor. Mechanical or electronic switching devices, such as SCR's or thyratrons, may be used to accomplish the necessary switching operation.

Figure 5:
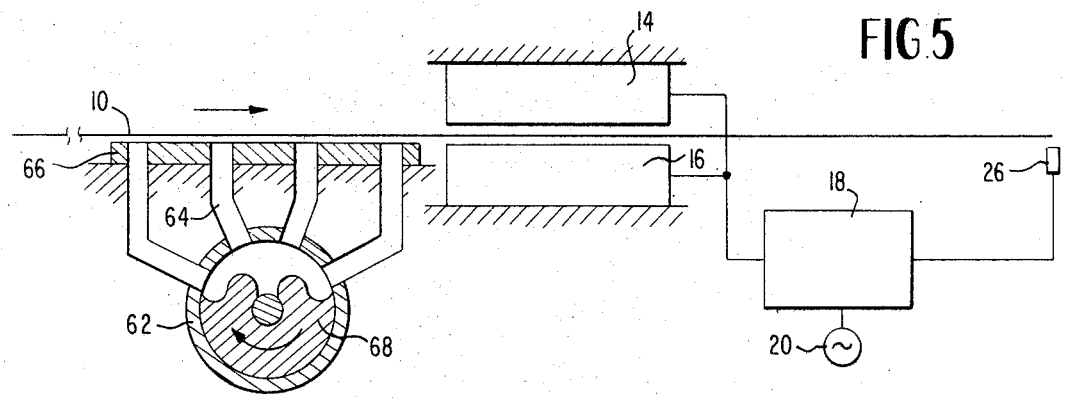
FIG. 5 is a schematic diagram of another embodiment of the improved foil feeding system including a friction brake having a suction actuator.

FIG. 5 illustrates an embodiment of the foil feeding system wherein suction pressure is used to attract the moving foil to a friction surface to accomplish braking. A rotary valve 62 is connected to a suitable vacuum source. The valve has a plurality of ports 64 which connect with openings in a stationary friction plate 66. When it is desired to brake the moving foil web 10, the motor controller 18 de-energizes the stators 14 and 16, and valve 62 is connected to the vacuum source to pull sheet 10 into contact with the friction surface 66 thereby braking the foil to a halt. Note that the rotary member 68 rotates clockwise so that when the valve is operated from its fully closed to the illustrated fully open position, the ports 64 are opened from left to right. Such an arrangement eliminates or minimizes bunching or wrinkling of the decelerating foil, thus improving the suction between friction plate 66 and the foil, and consequently improving the braking force. When braking is desired, the rotary valve member 68 is driven by means of mechanical linkage in synchronism with whatever machine into which the foil 10 is being fed. The rotary valve and vacuum source may be replaced by a rotating or reciprocating vacuum pump which can be connected directly to the openings in the friction plate 66.

Figure 6:
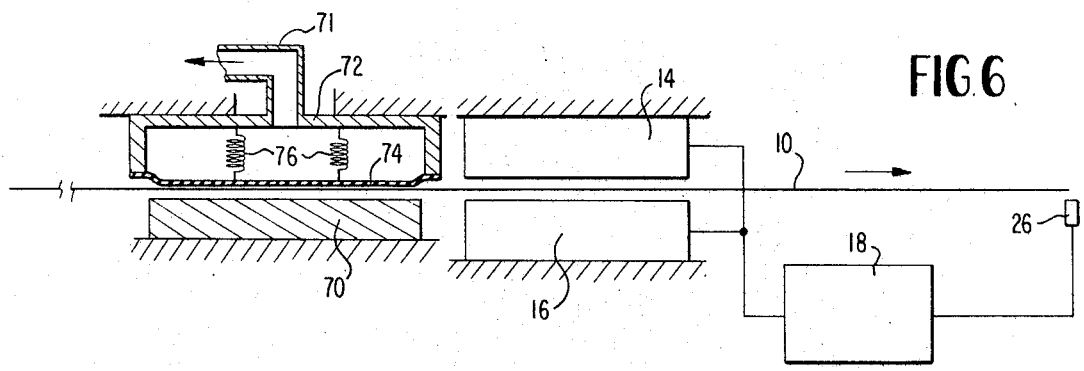
FIG. 6 is a schematic diagram of another embodiment of the improved foil feeding system including a friction brake having a pneumatic pressure actuator.

In the embodiment of FIG. 6, a stationary friction surface 70 is positioned beneath the moving foil 10. High pressure air or other suitable fluid is applied to the inlet 71 of a housing 72 positioned above the moving foil. The lower end of the housing is closed by a flexible diaphragm 74 which is normally maintained upwardly out of engagement with foil 10 by means of a return spring 76. When it is desired to brake the tape to a halt, the stators 14 and 16 are de-energized, and high pressure is applied to housing 72 to force the diaphragm 74 downwardly into engagement with foil 10 which is consequently pressed into engagement with the friction surface 70.

Figure 7:
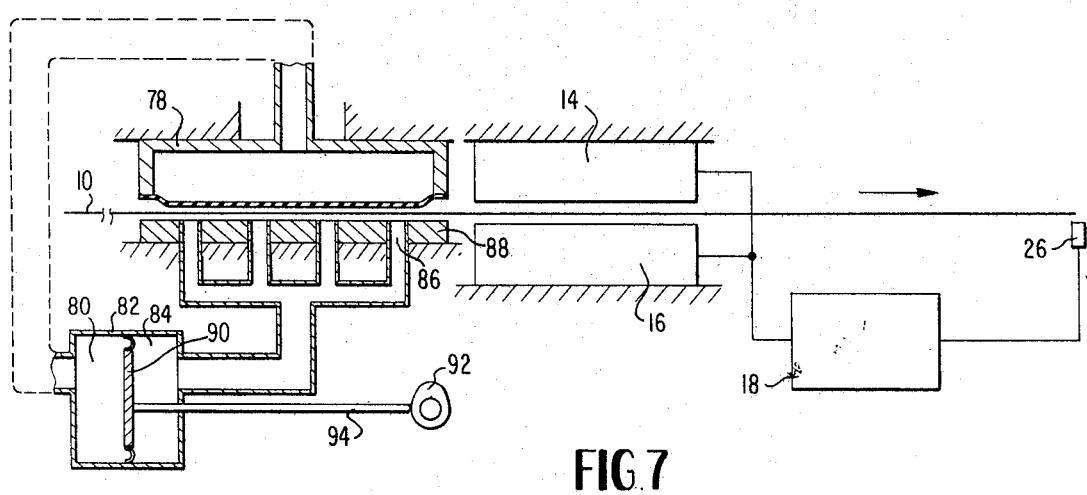
FIG. 7 is still another embodiment of the improved foil feeding system including a friction brake having both vacuum and pressure actuators.

The FIG. 7 embodiment includes both suction and high pressure braking means. A stationary pressure braking means 78 is positioned above the foil 10 and connected to the high pressure chamber 80 of a reciprocating piston compressor 82. The vacuum chamber 84 of the compressor is connected to ports 86 in a stationary friction plate 88 mounted below foil 10 and opposite the pressure braking means 78. The piston 90 of compressor 82 is driven through a piston rod 94 by a cam 92 which is rotated in synchronism with the device into which the foil is being fed, whereby the pressure and suction brakes are alternately activated in synchronous fashion.

FIGS. 8 through 11 illustrate another embodiment of the improved strip feeding actuator particularly adapted for the pulsed feeding of foil in precise increments of length. As shown in FIG. 8, the actuator includes frame members 100, 102 positioned in overlying relation and pivoted respectively to the ends of the pair of links 104, 106. The pivot of link 104 with the lower frame member 102 and the pivot of link 106 on upper frame member 100 are shown as being connected to the ends of a fluid motor 108 comprising a cylinder and piston which may be actuated to separate the frame members for cleaning or other maintenance or inspection.

A solenoid operated valve S connected to a suitable source of fluid under pressure is provided with outlets connected to each end of the cylinder of the fluid motor 108 to deliver pressurized fluid thereto and to return fluid dumped therefrom. When the solenoid valve S is de-energized, it is desirable that the fluid motor 108 apply a biasing force to bias the upper frame member 100 toward the lower frame member 102.

FIG. 8 includes a supply of strip foil in the form of a supply roll 110. In order to minimize the high inertia loading and the tensile stresses on the foil being fed through the actuator, the supply roll 110 is provided with a drive M which is automatically coordinated with the speed of the movement of foil through the system by means of a control 112 which may include a switch 113 in the control circuit of drive M which is actuated by contact with foil loop 114 to provide a predetermined amount of slack in the foil at the inlet of the linear motor actuator. In this manner, the linear motor actuator is not required to impart a pulling force sufficient to overcome the high inertia loading of the feed roll 110 thereby reducing the power requirements of the linear induction motor actuator while permitting an increase in the foil speed.

As shown in FIG. 9, the frame members 100, 102 respectively mount stators 14, 16 spaced by an air gap in the same manner as in the above described embodiments. These stators are laterally spaced apart on the downstream end of the frame members 100, 102. Mounted upstream of the stators 14, 16 and centered on the center-line of the foil 114 is a DC eddy current brake 118 with its poles arranged to create a flux field encompassing foil passing through the actuator. Laterally of the eddy current brake 118 are a pair of solenoid operated clamps 120 which are spring biased into engagement with the foil.

This embodiment of the invention includes a means for controlling the pulsed feeding of precise incremental lengths of foil. As illustrated, a solenoid operated punch 122 is mounted at the upstream end of the frame members 100, 102 to punch reference holes 124 adjacent the edge of the foil as hereinafter more fully described.

A pair of sensors 126, 128 are adjustably mounted in spaced apart relationship downstream of the punch 122 so as to detect the passing of holes 124 to provide a precise control of the operation of the actuator. The sensors 126, 128 are preferably photoelectric cells which detect a change in light level as holes 124 pass to control the foil feeding system when an incremental length of the foil, as measured from the punch 122, has been advanced. Adjusting rods 130, 132 are provided to adjust the distance of the sensors 126, 128 from the punch 122 and from each other.

In order to assure the passage of the aperture 124 past the sensors 126, 128 for the required detection, it is desirable to provide a pair of edge guide rails 134, 136 on the bottom frame member 102 to limit the lateral deviations of the foil.

Figure 10:
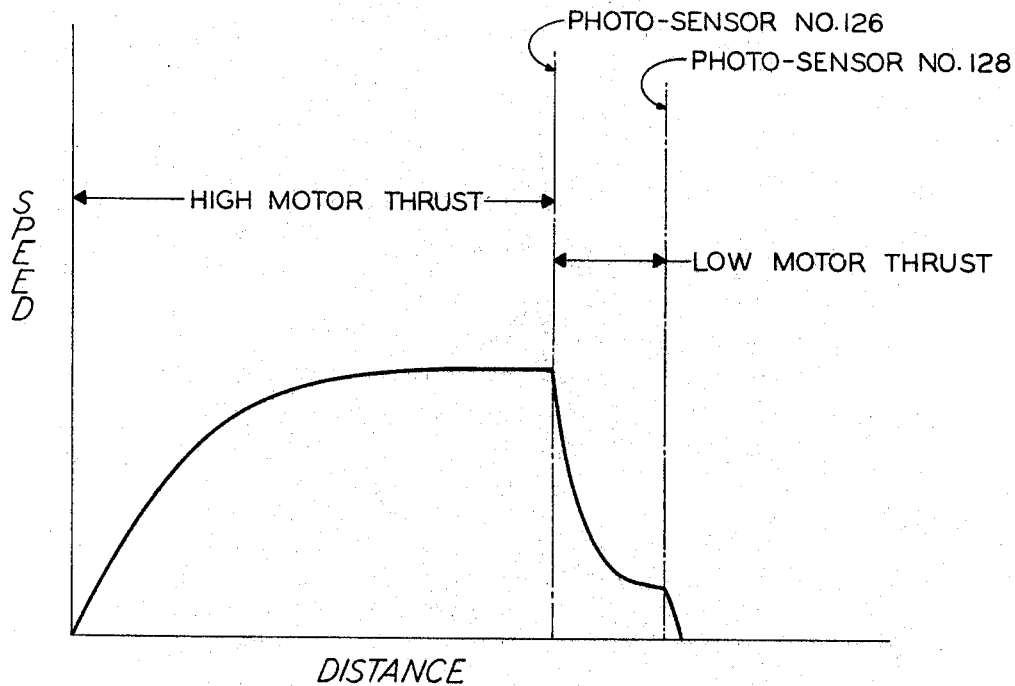
FIG. 10 is a graphic illustration of the profiled control of the system of FIG. 8 to provide a pulsed feeding of fixed incremental lengths of foil.
Figure 11:
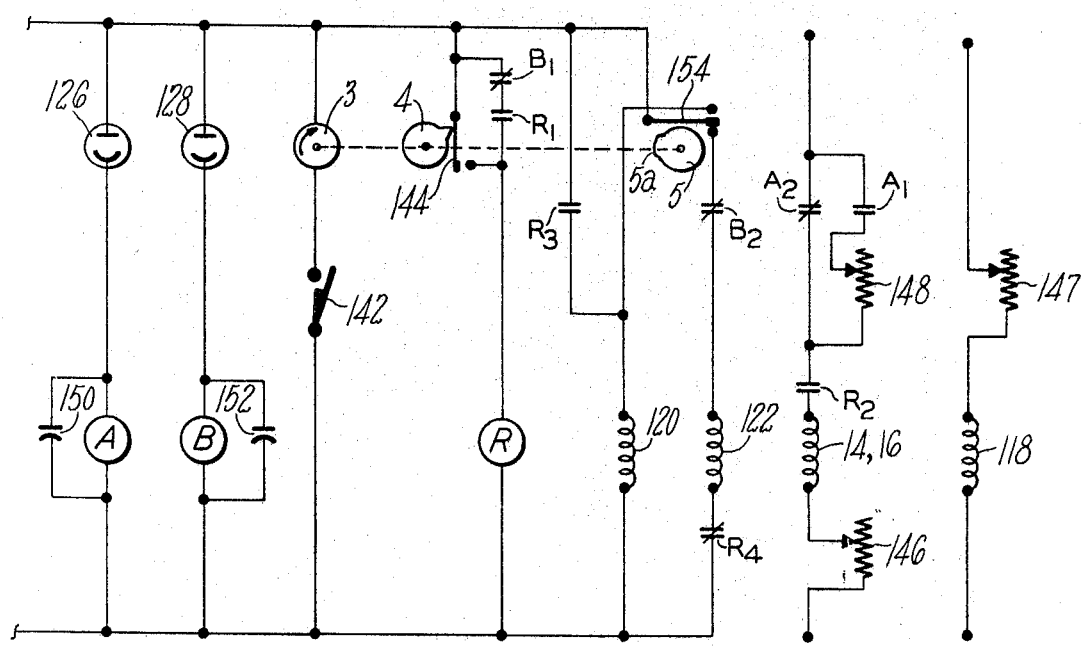
FIG. 11 is a schematic representation of a control circuit suitable for the pulsed feeding illustrated in FIG. 10.

FIG. 11 is a simplified schematic representation of a control circuit for producing the high speed pulsed feeding of the foil as graphically illustrated in FIG. 10. The pair of photoelectric cells 126, 128 and a rotating timer 3 having a pair of cam plates 4 and 5 control the recycled pulsed feeding of the system. In FIG. 11, the contacts are shown as being open or closed depending upon their condition when they are not actuated.

The closing of switch 142 energizes the timer 3 so that the disc 4 momentarily closes microswitch 144 to energize relay coil R. This, in turn, closes contacts R1 to lock in relay coil R when the microswitch 144 opens. It also opens R4 to lock out punch 122 and closes contacts R2 to energize the linear induction motor stators 14, 16 to connect the motors across a suitable AC power source through normally closed contacts A2 to apply maximum voltage to energize the stators. The forward thrust applied to the foil causes a fast build-up of speed in the foil. As illustrated, the DC eddy current brake is continuously energized and produces a retarding force which increases with speed. Together with the propelling force of the motor stators, this braking establishes the maximum foil speed as shown in FIG. 10. The relative retarding and propelling forces may be profiled by adjusting the voltages applied to the stators 14, 16 and brake 118 through voltage regulating means represented in FIG. 11 by variable impedances 146 and 147 to accommodate varying inertia and resistance levels of the foil.

When the hole 124 passes the sensor 126, relay A is energized to open the switch A2 and close the switch A1 to continue the power to stators 14, 16 at a reduced level through adjustable impedance 148 to continue a light propelling force on the foil. Since the eddy current brake coil is continuously energized and produces a retarding force on the foil in proportion to foil speed, the foil speed drops rapidly to a low level as indicated in FIG. 10. A suitable means is provided for maintaining the low level energization to stators 14, 16 until the hole 124 reaches the sensor 128, and in the schematic circuit illustrated, such a means is represented by capacitor 150 which continues the energization of relay A.

When the hole 124 reaches the sensor 128, relay B is energized to open contacts B1 and de-energize relay R which, in turn, opens contacts R2 to de-energize stators 14, 16. Contacts R3 are also closed to de-energize clamps 120 which are spring biased into engagement with the foil to bring it to a complete stop. Because of the low inertia load of the foil, the foil may be stopped in about 0.1" despite the response time of the clamps 120 and the slippage of the foil even when the number of cycles of feeding one foot increments of foil exceeds 450 per minute.

The energization of relay B also opens contacts B2 to prevent the punch 122 from being energized. These circuit conditions are continued and in FIG. 11 this function is represented as being performed by capacitor 152 after the hole 124 is past sensor 128.

As shown in FIG. 11, the cam 5 engages microswitch 154 to open the circuit to the punch 122 and close the circuit to the clamp 120 so that both of these devices are inactive following the de-energization of relay B. The cam 5 engages the microswitch 154 for a period of time determined by the angular extent of the lobe 5a of the cam 5 so that when the lobe releases microswitch 154, the clamp 120 is de-energized to clamp the foil, and the punch 122 is energized to produce the next reference hole 124. Upon further rotation of the timer 3, the cam 4 momentarily engages microswitch 144 to repeat the cycle.

Thus, the embodiment of FIG. 8 is especially suited for the precise incremental feeding of foil of different inertia and electrical resistance values due to the adjustability of the propelling and retarding forces imposed by the eddy current brake 118 and the linear induction stators 14, 16 for the profiling of the forces acting on the foil. Moreover, the punch 122, coupled with the photoelectric sensors 126, 128, which cooperate to slow down and stop the foil after a precise length has been incrementally fed, together with the adjustability of the photoelectric sensors relative to the punch 122 and to each other, further provides adaptability in the handling of different foils at different speed levels.

Finally, the absence of any requirement on the actuator for powering the supply of foil to the actuator minimizes the thrust requirements of the actuator minimizing the power requirements of the actuator and the stress levels imparted to the foil.

While the invention has been particularly shown and described with reference to preferred embodiments thereof, it will be understood by those skilled in the art that various changes in form and details may be made therein without departing from the spirt and scope of the invention.

We claim:

1. An improved metallic foil feeding system comprising:
   (a) a fixed open-sided linear induction stator means having an air gap,
   (b) a metallic foil positioned within the air gap to act as the movable armature of an effective linear induction motor formed by said foil and said stator means,
   (c) means for applying electrical power to said stator means whereby said foil is fed through said gap by forces generated by induction motor action,
   (d) solenoid actuated means for clamping the foil when the foil is not moving, and
   (e) an inductive foil speed sensing means for operating said solenoid actuated clamping means when said tape is not moving.

2. An improved metallic foil feeding system comprising:
   (a) a fixed open sided linear induction stator means having an air gap,
   (b) a metallic foil positioned within the air gap to act as the movable armature of an effective linear induction motor formed by said foil and said stator means,
   (c) means for applying electrical power to said stator means whereby said foil is fed through said gap by forces generated by induction motor action,
   (d) brake means comprising a stationary friction surface for decelerating the moving foil,
   (e) means for attracting the foil into engagement with said friction surface,
   (f) said attracting means comprises suction means for applying suction to said foil to attract said foil into engagement with said friction surface, and
   (g) said suction means comprising means for sequentially applying suction to a plurality of ports disposed adjacent the foil along the length thereof so that the suction is sequentially applied to the foil from the upstream to the downstream end thereof.

3. An improved metallic foil feeding system comprising:
   (a) a fixed open-sided linear induction stator means having an air gap,
   (b) a metallic foil positioned within the air gap to act as the movable armature of an effective linear induction motor formed by said foil and said stator means,
   (c) means for applying electrical power to said stator means whereby said foil is fed through said gap by forces generated by induction motor action,
   (d) brake means comprising a stationary friction surface for decelerating the moving foil,
   (e) means for attracting the foil into engagement with said friction surface,
   (f) said attracting means comprising fluid pressure means on one side of said foil for forcing said foil into engagement with said friction surface,
   (g) suction means on the other side of said foil for attracting said foil into engagement with said friction surface, and
   (h) means for alternately operating said suction and fluid pressure means.

4. An improved metallic strip actuator comprising:
   (a) a fixed open-sided linear induction stator means having an air gap,
   (b) a metallic strip positioned within the air gap to act as a movable armature of an effective linear induction motor formed by said foil and said stator means,
   (c) means for applying electrical power to said stator means whereby said strip is fed through said air gap by forces generated by induction motor action, and
   (d) an induction brake, when energized providing a flux field encompassing said strip, said induction brake energized simultaneously with said stator means to control the speed of said strip.

5. The device of claim 4 wherein the induction brake is disposed upstream of said stator means relative to the path of movement of said strip material.

6. The device of claim 5 wherein the induction brake is a DC eddy current brake exerting a braking force centered on the strip and the stator means exerts a propelling force on laterally spaced portions of the strip disposed symmetrical to the centerline of the strip.

7. The device of claim 4 wherein means are provided for adjusting the braking force extered by said brake relative to the propelling force exerted by the stator means to profile the forces acting on the strip to accommodate varying inertia loads and electrical resistance of the strip propelled by the actuator.

8. The device of claim 4 wherein the induction brake is energized continuously during the use of the actuator.

9. The device of claim 4 wherein electric circuit means are provided to control the energization of said stator means and said induction brake for incrementally advancing the strip.

10. The device of claim 9 wherein said electric circiut means includes means for reducing the propelling force of said stator means on said strip during the end portion of each incremental movement of the strip to reduce the speed of the strip movement while maintaining a low level of such propelling force.

11. The device of claim 9 including a sensor for sensing the length of strip advanced during each incremental movement, said sensor providing a signal for halting said strip when the strip has been advanced a predetermined distance during said incremental movement.

12. The device of claim 11 wherein said sensor comprises means for forming a hole through said strip and a photocell downstream thereof.

13. The device of claim 12 including a pair of photocells positioned in tandem downstream of said hole forming means, one of said photocells providing a signal to reduce the propelling force of said stator means and the other providing a signal to actuate a braking clamp to halt the movement of the strip.

14. The device of claim 13 wherein the electric circuit means includes an automatic timing means to control the energization of said stator means to recycle the operation of the actuator.

15. The device of claim 13 including means for profiling the braking force of said induction brake and the propelling force of the stator means relative to each other during different portions of each incremental movement of the strip.

16. The device of claim 4 wherein the stator means includes a pair of frame members spaced apart to form said air gap and a motor is provided to separate the frame members for maintenance.

17. The device of claim 16 wherein the motor comprises a fluid actuated cylinder and means are provided for biasing the frame members toward each other during the operation of the actuator.

References Cited

UNITED STATES PATENTS

| | | | |
|---|---|---|---|
| 1,706,741 | 3/1929 | Pugh | 226—94 X |
| 2,603,688 | 7/1952 | Cole et al. | 226—200 X |
| 2,731,212 | 1/1956 | Baker. | |
| 2,788,209 | 4/1957 | Montijo | 226—145 X |
| 2,831,131 | 4/1958 | Klotz. | |
| 3,032,245 | 5/1962 | George et al. | 226—39 |
| 3,061,159 | 10/1962 | Jacobsen | 226—97 X |

FOREIGN PATENTS 716,229  9/1954  Great Britain.

ALLEN N. KNOWLES, Primary Examiner

U.S. Cl. X.R.

226—188, 120